United States Patent
Kajimura (10) Patent No.: US 11,272,109 B2
(45) Date of Patent: Mar. 8, 2022

(54) BLUR CORRECTION CONTROL APPARATUS, METHOD, AND STORAGE MEDIUM

(71) Applicant: CANON KABUSHIKI KAISHA, Tokyo (JP)

(72) Inventor: Fumihiro Kajimura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/352,879

(22) Filed: Jun. 21, 2021

(65) Prior Publication Data

US 2021/0409603 A1 Dec. 30, 2021

(30) Foreign Application Priority Data

Jun. 29, 2020 (JP) .............................. JP2020-111909

(51) Int. Cl.
*H04N 5/232* (2006.01)
(52) U.S. Cl.
CPC ..... *H04N 5/23287* (2013.01); *H04N 5/23267* (2013.01)

(58) Field of Classification Search
None
See application file for complete search history.

(56) References Cited

U.S. PATENT DOCUMENTS

| 2017/0019600 A1* | 1/2017 | Koyano | ................. G03B 17/14 |
| 2020/0177816 A1* | 6/2020 | Takeuchi | ........... H04N 5/23209 |

FOREIGN PATENT DOCUMENTS

| JP | 2016-014717 A | 1/2016 |
| JP | 2016-163206 A | 9/2016 |

* cited by examiner

*Primary Examiner* — Cynthia Segura
(74) *Attorney, Agent, or Firm* — Canon U.S.A., Inc. IP Division (57) ABSTRACT

An apparatus includes an obtaining unit configured to obtain information related to as shake detected by a sensor, and a control unit configured to cause one correction device, out of a first correction device that is positioned in a lens and that can correct a blur based on the information related to the shake and a second correction device that is positioned in a capturing apparatus and that can correct image blur based on the information related to the shake, to perform a blur correction operation, and configured to cause the other correction device, out of the first correction device and the second correction device, to perform a periodic operation.

18 Claims, 4 Drawing Sheets

BLUR CORRECTION CONTROL APPARATUS, METHOD, AND STORAGE MEDIUM

BACKGROUND OF THE DISCLOSURE

Field of the Disclosure

The aspect of the embodiments relates to a blur correction technique in an image capturing apparatus.

Description of the Related Art

Various types of blur correction (image stabilization) apparatuses have been proposed in order to prevent image blur that is due to hand shaking of the photographer when capturing images with a digital camera. Known types of blur correction apparatuses include an optical blur correction method in which a correction lens is caused to shift in a direction that is approximately orthogonal with respect to the optical axis, and an image capturing plane blur correction method in which an image capturing element is caused to shift in a direction that is approximately orthogonal with respect to the optical axis.

In recent years it has been proposed that such blur correction apparatuses be used even for objectives other than blur correction.

Japanese Patent Laid-Open No. 2016-163206 discloses an image capturing apparatus that, by high-frequency driving of an image capturing element using a blur correction apparatus at minute amplitudes, can achieve the effect of an optical low-pass filter (hereinafter, LPF) by allowing a light beam of a subject to enter a plurality of pixels of an image capturing element and remove moiré. This driving method is called LPF driving hereinafter.

Also, Japanese Patent Laid-Open No. 2016-14717 discloses a method by which it is possible to achieve an LPF effect by having a correction lens as a blur correction unit and performing the aforementioned LPF driving with the correction lens.

Japanese Patent Laid-Open No. 2016-163206 and Japanese Patent Laid-Open No. 2016-14717 disclose LPF driving in image capturing plane blur correction and optical blur correction respectively. Meanwhile, with recent lens-interchangeable type digital cameras, often lenses having an optical blur correction unit are mounted on a camera having an image capturing plane blur correction unit, and blur correction is performed using the two blur correction units.

The above Japanese Patent Laid-Open No. 2016-163206 and Japanese Patent Laid-Open No. 2016-14717 do not disclose a method for performing LPF driving in a configuration having two blur correction units, and no optimal LPF driving method that considers the influence on blur correction at the time of LPF driving and power consumption has been presented.

SUMMARY OF THE DISCLOSURE

According to a first aspect of the embodiments, there is provided an apparatus, comprising at least one processor; and a memory coupled to the at least one processor storing instructions that, when executed by the at least one processor, cause the processor to function as: an obtaining unit configured to obtain information related to an apparatus shake detected by a sensor, and a control unit configured to cause one correction device, out of a first correction device that is positioned in a lens and that can correct a blur based on the information related to a shake and a second correction device that is positioned in a capturing apparatus and that can correct blur based on the information related to the shake, to perform a blur correction operation, and configured to cause the other correction device, out of the first correction device and the second correction device, to perform a periodic operation.

According to a second aspect of the embodiments, there is provided a method comprising: obtaining information related to a shake detected by a sensor, and causing one correction device, out of a first correction device that is positioned in a lens and that can correct a blur based on the information related to the shake and a second correction device that is positioned in a capturing apparatus and that can correct image blur based on the information related to the shake, to perform a blur correction operation, and causing the other correction device, out of the first correction device and the second correction device, to perform a periodic operation.

Further features of the disclosure will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

First Embodiment

<Configuration of Image Capturing Apparatus>

Figure 1A:
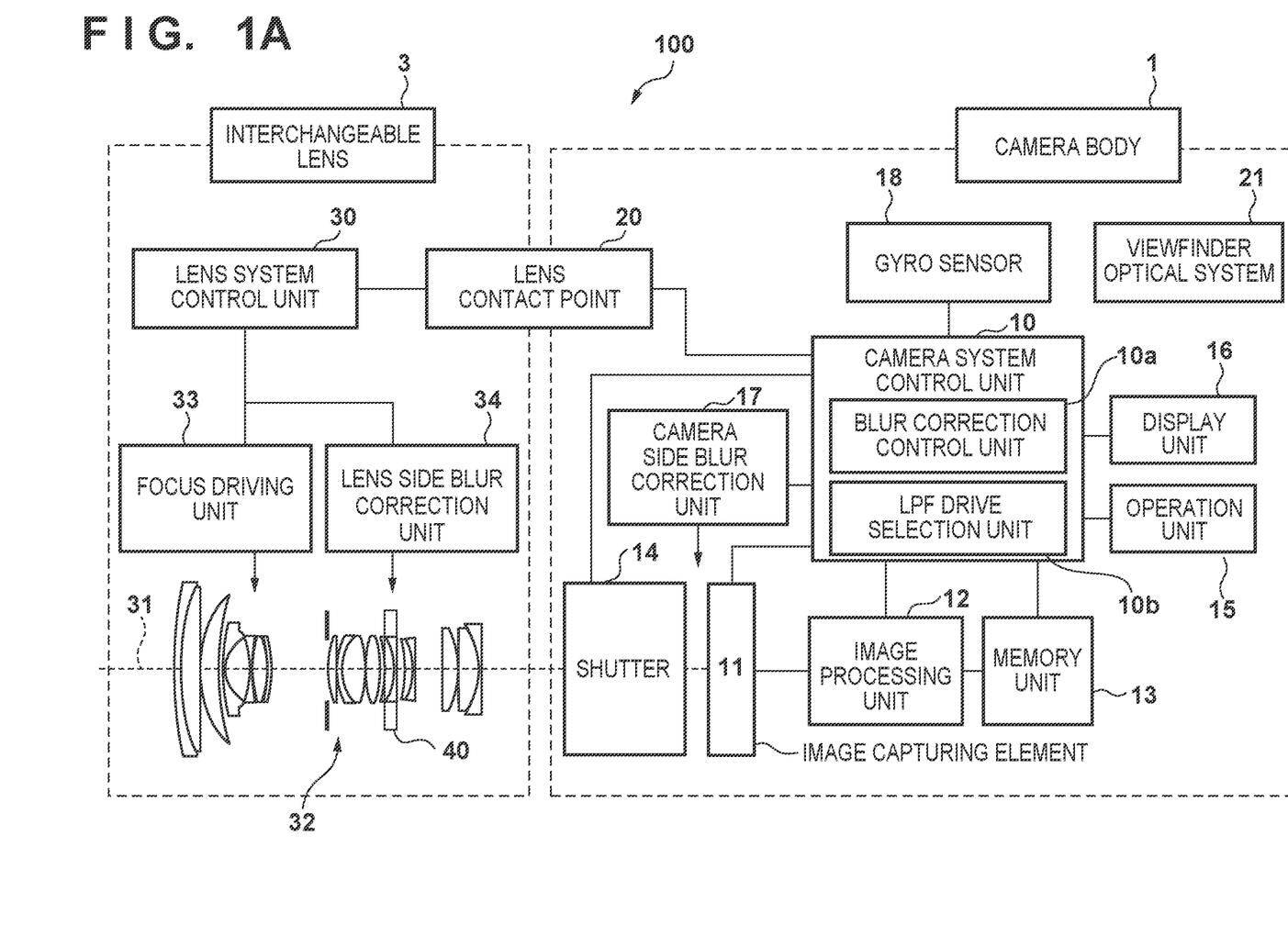
FIGS. 1A and 1B illustrate a block configuration of a digital camera system as an image capturing apparatus according to a first embodiment of the disclosure.
Figure 1B:
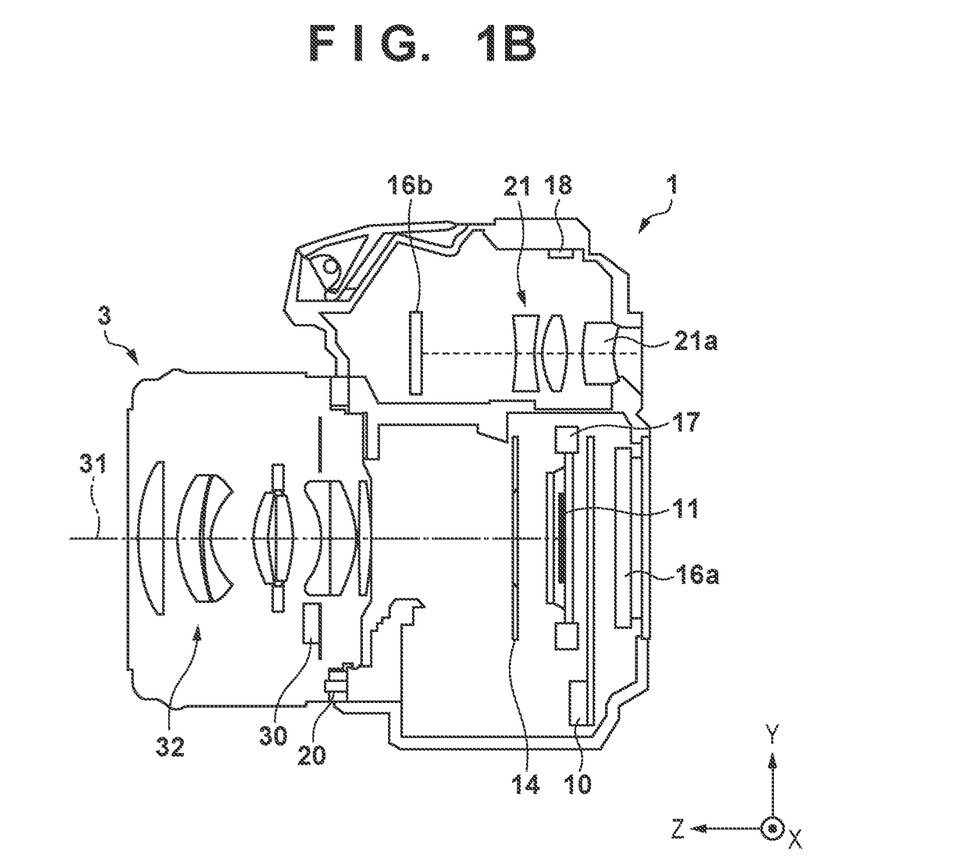

FIGS. 1A and 1B illustrate a block configuration of a digital camera system which is a first embodiment of an image blur correction (image stabilization) control apparatus of the disclosure.

In FIG. 1A, a digital camera system 100 is configured by an interchangeable lens (an imaging lens) 3 which is detachably mounted to a camera body 1. The camera body 1 is provided with an image capturing element 11 which receives a light beam that passes through an interchangeable lens 3, an image processing unit 12 which generates images from signals obtained by photoelectric conversion at the image capturing element 11, and a memory unit 13 where information such as image information is recorded. Also, it comprises a focal-plane shutter 14 (hereinafter, simply referred to as a shutter) which controls light-shielding/ passage of a light beam toward the image sensor 11, an operation unit 15 which recognizes user operations, a display unit 16 which displays images or the like, and a viewfinder optical system 21.

The display unit 16 comprises, as illustrated in FIG. 1B, a back surface liquid crystal unit 16a positioned at the back surface of the camera body 1 and a viewfinder display unit 16b which is positioned in the viewfinder optical system 21 and can be looked at through an eye piece lens 21a. The display unit 16 is controlled by a display control unit which controls display images, and a user can switch arbitrarily whether to display images on the back surface liquid crystal unit 16a or the viewfinder display unit 16b.

Also, the camera body 1 comprises a camera side blur correction unit 17, which causes the image capturing element 11 to move so as to shift in a direction approximately orthogonal to an optical axis 31 and rotate about an axis approximately parallel to the optical axis 31 and comprises a gyro sensor 18 which is a shake detection means for detecting the angular velocity of the angular shake of the camera body 1. It further comprises a camera system control unit 10 which handles the above controls. Note that, the camera system control unit 10 comprises a blur correction control unit 10a and an LPF drive selection unit 10b which are described later. The LPF drive selection unit 10b performs control for selection of which of the camera side blur correction unit 17 or a lens side blur correction unit 34 described later to use for LPF driving. Note that, LPF driving is a method for achieving the effect of an optical low-pass filter (hereinafter, LPF) which, by high-frequency driving of a subject image using a blur correction unit at minute amplitudes on an imaging plane, allows a light beam of a subject to enter a plurality of pixels of an image capturing element and removes moire.

The shutter 14 has shutter curtains comprising of a first curtain and a second curtain, and by causing each shutter curtain to pass within a shutter aperture, controls shielding and passage of light beams that enter the image capturing element 11 from an image capturing optical system 32 of the interchangeable lens 3. In the shutter 14, drive control is performed by the camera system control unit 10.

Meanwhile, the interchangeable lens 3 has the image capturing optical system 32 which is centered on the optical axis 31 and through which light beams are allowed to pass, a focus driving unit 33 that drives a focus lens, and the lens side blur correction unit 34 that causes a shift lens 40 to move so as to shift in a direction approximately orthogonal to the optical axis 31. The interchangeable lens 3 further comprises a lens system control unit 30 which handles these controls.

Note that the camera body 1 and the interchangeable lens 3 can exchange electrical signals via a lens contact point 20 which is connected electrically.

The image capturing element 11 performs photoelectric conversion in relation to a light beam (an image formed by the optical system) that has passed through the image capturing optical system 32 of the interchangeable lens 3 and the aperture of the shutter 14, and the output signal is converted into a digital signal by an A/D conversion unit (not shown). The image processing unit 12 internally has a white balance circuit, a gamma correction circuit, an interpolation calculation circuit, and the like, and by an instruction of the camera system control unit 10, generates image data from a signal obtained from the image capturing element 11. The image data generated by the image processing unit 12 is stored in the memory unit 13.

The camera system control unit 10 comprises a CPU (central processing unit) or the like, and controls the overall operation of the camera body 1 including communication with the interchangeable lens 3. The camera system control unit 10 generates a timing signal or the like for image capture and outputs the timing signal to each unit. Furthermore, in a case where a release button included in the operation unit 15 is pressed and thereby the camera system control unit 10 receives an instruction for image capturing or a preparation operation thereof, the camera system control unit 10 controls the image capturing element 11 in response to that instruction, and transmits a control signal to the lens system control unit 30. The release button can detect a half-press operation which is a pushing amount of a first stage, and when pressed even further, a full-press operation which is a pushing amount of a second stage. When the half-press operation is detected, a shooting preparation operation such as an autofocus (hereinafter AF) operation is performed. Furthermore, when a full-press operation of the release button is detected from that state, the shutter 14 is driven and an exposure operation for still image capturing is started.

<Blur Correction Operation>

Next, a blur correction operation will be described. First, a blur correction operation on a camera side will be described.

The gyro sensor 18 is an angular velocity sensor, and detects an angular velocity of a rotation of the camera. An output signal of the gyro sensor 18 is inputted to the blur correction control unit 10a, and filter processing and integration processing are performed and a camera angle blurring component is calculated. Also, the blur correction control unit 10a, based on this value, generates a driving signal of the camera side blur correction unit 17.

As illustrated in FIG. 1B, a direction towards a subject on the optical axis 31 is treated as the positive Z-axis, the upward direction of the camera body 1 is treated as a positive Y-axis, and a direction coming out of the surface of the page (FIG. 1B) as the remaining axis is treated as the positive X-axis. In such a case, the gyro sensor 18 can detect an angular velocity of a rotation about each axis of the camera body 1. In the gyro sensor 18, three sensors for the respective axial directions may be configured as a single package, or three packages may be configured to be installed for the respective axial directions.

The camera side blur correction unit 17, based on the detection signal of the gyro sensor 18, causes the image capturing element 11 to move so as to shift within the XY plane which is approximately orthogonal to the optical axis 31, and performs correction of image blur by rotational movement about an axis that is approximately parallel to the Z-axis (the optical axis 31). By moving the image capturing element 11 so as to shift it within the XY plane, it is possible to correct angular shake of the pitch direction and the yaw direction of the camera, and by moving the image capturing element 11 so that it rotates about an axis that is approximately parallel to the Z-axis (the optical axis 31) it is possible to correct blurring due to roll.

Meanwhile, a driving signal generated by the blur correction control unit 10a is delivered via the lens contact point 20 and the lens system control unit 30 to the lens side blur correction unit 34. The lens side blur correction unit 34, unlike the camera side blur correction unit 17, causes the shift lens 40 to move so as to shift in the XY plane which is approximately orthogonal to the optical axis 31, and to correct angular shake in the pitch direction or the yaw direction of the camera.

<LPF Driving Mode>

Next, using FIGS. 2A and 2B and FIGS. 3A and 3B, a method of performing LPF driving (periodic operation) using the camera side blur correction unit 17 will be described.

Figure 2A:
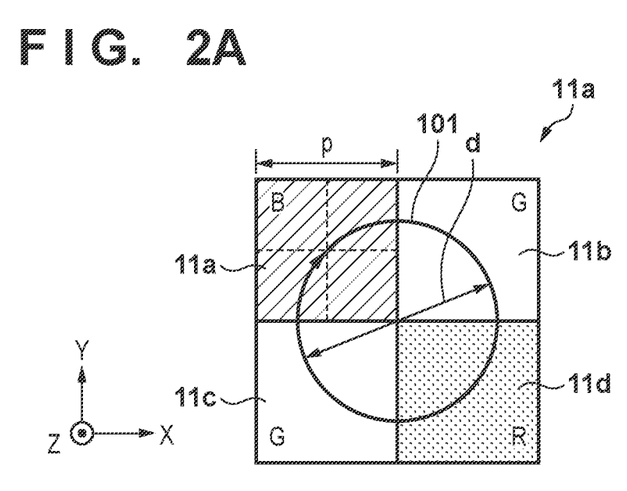
FIGS. 2A and 2B are views that extract and magnify some image capturing elements.
Figure 2B:
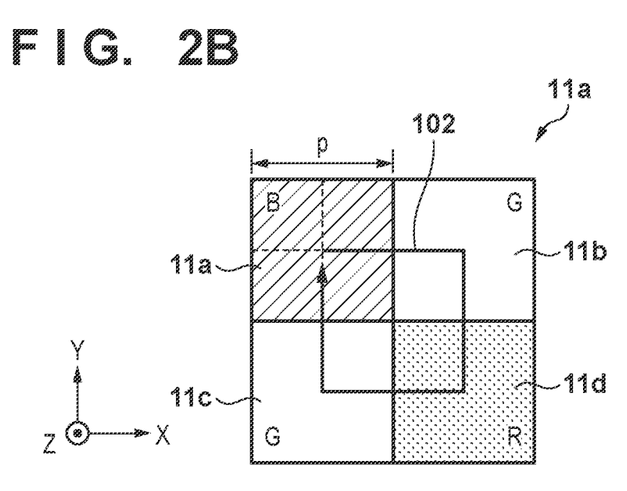

FIGS. 2A and 2B are figures that magnify an extracted portion of the image capturing element 11, and only four pixels, a B (blue) pixel 11a, a G (green) pixel 11b, a G (green) pixel 11c, and an R (red) pixel 11d, are shown. Each of the pixels 11a to 11c photoelectrically converts color component light (color bands) of subject light beams that are incident after passing through a color filter of one of the colors R (red), G (green), or B (blue) arranged on the front surface thereof, and accumulates charge according to the strength thereof (luminance).

FIG. 2A illustrates that four pixels of an R, G, B Bayer array color filter are arranged in a matrix pattern with a pixel arrangement pitch of p. In an actual image capturing element, this pixel arrangement is laid out repeatedly many times. In the case of performing LPF driving in the camera side blur correction unit 17, the image capturing element 11 is moved (a circular motion) at a constant speed in an arc shape of a diameter d about the optical axis of the image capturing optical system 32 as with an arrow symbol 101 of the circle illustrated in FIG. 2A. Hereinafter, an operation in which the image capturing element 11 moves at a constant speed in an arc shape is called a circular operation. The circular arrow symbol 101 is set so as to pass through the approximate center of each of the pixels 11a to 11d, and the diameter d is given by Expression (1) below.

$$d = \sqrt{2} \cdot p \quad (1)$$

When performing an arc-shaped operation as described above during a still image exposure, the light beam incident on the B pixel 11a at the time of non-operation enters each of the pixels 11a to 11d equally, and so the same effect as an optical low-pass filter (LPF) is achieved. To achieve the LPF effect, it is sufficient to perform at least one period worth of the above-described circular operation during a still image exposure. Also, in the case of performing multiple circular operations, a circular operation of an integer number of periods is performed during the exposure period. In the case where the number of times of the circular operation is not an integer multiple, non-uniformity will occur due to the amount of light incident on the four pixels differing, but when a circular operation is performed at a high-frequency of a sufficiently short period in relation to the exposure period, it is possible to achieve a satisfactory LPF effect since the difference in the amounts of light that enter the respective pixels will be small. With high-frequency driving of a circular operation, it is possible to simplify control since it is not necessary to change the frequency of the circular operation in accordance with the exposure period.

In the present embodiment, by performing circular operation driving at a high-frequency in an LPF driving mode, an LPF effect is achieved. Note that in the present embodiment, the diameter d of the circle of the circular operation is assumed to be the value indicated in Expression (1), but this need not be the case. By increasing the diameter of the circular operation, it is possible to enhance the LPF effect, and it is possible to weaken the LPF effect by reducing the diameter. Also, in the case of outputting data of pixels extracted intermittently from the image capturing element 11 in order to perform a preview display on the display unit 16 prior to the image capturing exposure operation, or the like, the diameter d may be changed to be aligned with the interval of the pixels intermittently extracted or the like.

Also, configuration may be taken so as achieve an LPF effect by driving as in FIG. 2B. FIG. 2B illustrates another example of LPF driving. In FIG. 2B, similarly to FIG. 2A, only the four pixels 11a to 11d are magnified and shown. It is possible to achieve an LPF effect even by moving the image capturing element 11 at a constant speed in a rectangular shape whose sides are p which is centered geometrically on the optical axis 31 of the image capturing optical system 32 as illustrated by an arrow symbol 102 in FIG. 2B. The arrow symbol 102 is set to pass through the approximate center of each pixel 11a to 11d, and the rectangle that the arrow symbol 102 traces is a square whose sides are of length p. Accordingly, even in a case of moving the image capturing element 11 in a rectangular shape, if the image capturing element 11 is moved periodically in relation to the optical axis, it is possible to achieve the LPF effect, and by adjust the length of the sides p, it is possible to adjust the intensity of the LPF effect. Configuration may be taken so that when a user selects an LPF effect intensity, the length of the diameter of the circular operation or the sides of the rectangle automatically switches.

Next, using FIGS. 3A and 3B, a method for driving the camera side blur correction unit 17 will be described.

Figure 3A:
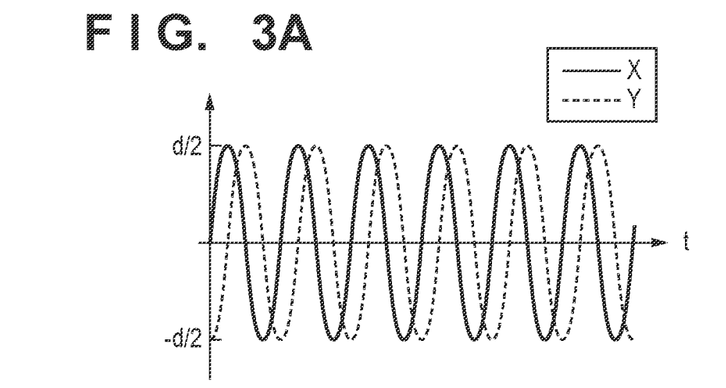
FIGS. 3A and 3B illustrate an amount of driving of a camera side blur correction unit in a case where the image capturing element is caused to perform LPF driving.
Figure 3B:
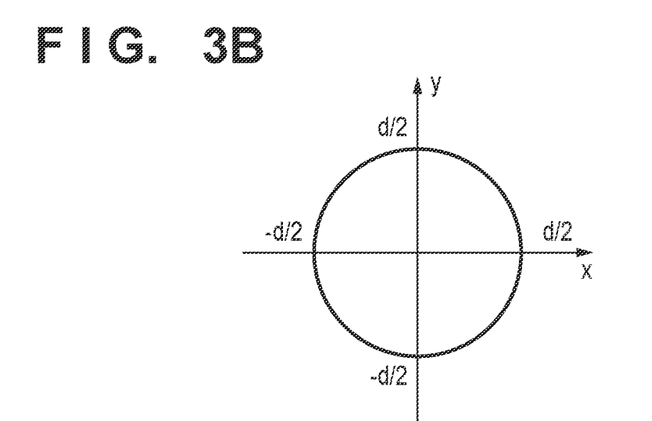

FIGS. 3A and 3B are views illustrating the amount of driving of the camera side blur correction unit 17 in the case of moving the image capturing element 11 as in FIG. 2A. In FIG. 3A, the amount of driving for movement in the X direction by the camera side blur correction unit 17 is illustrated in a solid line, and the amount of driving for movement in the Y direction is illustrated in a dashed line. In FIG. 3A, the driving of the X direction is performed according to a sinusoidal wave of an amplitude d/2 and a frequency of f [Hz]. Also, the driving in the Y direction is similarly performed using a sinusoidal wave with an amplitude d/2 and a frequency f [Hz]. However, the driving in the X direction and the driving in the Y direction are performed with a phase shift of π/2. FIG. 3B is a view illustrating movement of the center of the image capturing element 11 illustrated in the XY plane in the case where the operation of FIG. 3A was performed. As illustrated in FIG. 3B, by a circular operation with a radius of d/2 being performed for the center of the image capturing element 11, a movement as illustrated in FIG. 2A is performed.

Accordingly, by driving the camera side blur correction unit 17 so that the relative movement amount of the optical axis of the image capturing optical system 32 and the image capturing element 11 periodically changes, and the image capturing element trace a predetermined path with the optical axis of the image capturing optical system as a reference, an LPF effect can be achieved. Such drive control for performing a high-frequency circular operation driving is called an LPF driving mode. The path whose reference is the optical axis 31 of the image capturing optical system 32 is a path of relative movement in relation to the optical axis 31, and it is a path that is traced when one movement in the X direction is regarded as being when the optical axis moved once in the X direction and the image capturing element moved twice in the X direction.

Next, an LPF driving mode in the lens side blur correction unit 34 will be described. The lens side blur correction unit 34 causes the shift lens 40 to shift in the X direction and the Y direction in the LPF driving mode, and a light beam focused on the pixel 11a of FIG. 2A is driven to move as does the arrow symbol 101. By such driving, it is possible to achieve an LPF effect. The driving amount of the shift lens differs depending on the movement sensitivity on the image capturing plane in relation to the movement amount of the shift lens 40, but sinusoidal driving is performed respectively in the X direction and the Y direction as illustrated in FIG. 3A, and thereby a circular operation is performed. Then, the path on the image capturing plane of the focused light beam is moved to match the arrow symbol 101 of FIG. 2A.

In LPF driving, since the image capturing element 11 or the shift lens 40 are driven at a high frequency, consumption of power tends to be large compared to a normal blur correction operation. In blur correction, a driven unit is driven in a frequency band of 10 Hz or less typically. In contrast to this, in LPF driving, as described previously, the amount of driving is minute compared to the blur correction, but the driven unit is driven at several 100 Hz. Accordingly, the acceleration increases, and the power consumption increases. Note that the proportion of the increase in power consumption of LPF driving when compared with blur correction differs depending on the blur correction method, and there are methods for which the increase is smaller.

First, an undesirable example will be described. In the undesirable example, the camera side blur correction unit 17 and the lens side blur correction unit 34 both perform a high-frequency circular operation to achieve an LPF effect. In such a case, unlike the above-described LPF driving, the camera side blur correction unit 17 causes the image capturing element 11 to perform a circular operation in an arc shape whose diameter is d/2, and the lens side blur correction unit 34 causes the shift lens 40 to perform a circular operation so that the light beam that is focused by passing through the image capturing optical system 32 traces an arc of diameter d/2. The circular operation of the shift lens 40 is performed using a waveform whose phase is π different to that of the circular operation of the image capturing element 11, and the focused light beam and the image capturing element 11 move in directions of opposite vectors.

The result of this is that the focused light beam, on the imaging plane, moves twice the amount of the diameter d/2, and an effect similar to that of LPF driving in the case of a circular operation in an arc shape of a diameter d by one of the blur correction units is achieved. Also, during capturing exposure, the camera side blur correction unit 17 and the lens side blur correction unit 34 both perform the above-described LPF driving, and each performs driving for correction of an image blur due to hand shaking. In driving for blur correction, the blur correction control unit 10a calculates a blur correction amount in each of the camera side blur correction unit 17 and the lens side blur correction unit 34, and executes blur correction.

For example, in a case where a correction driving amount on the image capturing plane for blur correction is B, the amount of driving of the camera side blur correction unit 17 is set to B/2, and the amount of driving of the lens side blur correction unit 34 is set to B/2 or the like. Next, for simplicity of explanation, the driving amount of the lens side blur correction unit 34 will be assumed to be the movement amount on the imaging plane of the focused light beam rather than the movement amount of the shift lens 40.

Accordingly, by driving the respective blur correction units, it is possible to achieve the LPF effect while performing blur correction. However, as described in the undesirable example above, in the method described here, the power consumption in both blur correction unit becomes large in order to drive the two blur correction units at a high frequency. Also, in this method, the phase of the circular operation of the two blur correction units is shifted by π, but in the case where the two blur correction units cannot be synchronized due to delay in communication via a lens contact point unit 20 or the like, it is thought that the LPF effect cannot be correctly achieved.

Accordingly, in the present embodiment, LPF driving is performed by one blur correction unit selected by the LPF drive selection unit 10b, and blur correction driving of the other blur correction unit is performed. Accordingly, it is possible to achieve an LPF effect with more accuracy while reducing power consumption by separating LPF driving and blur correction.

<Imaging Operation>

Figure 4:
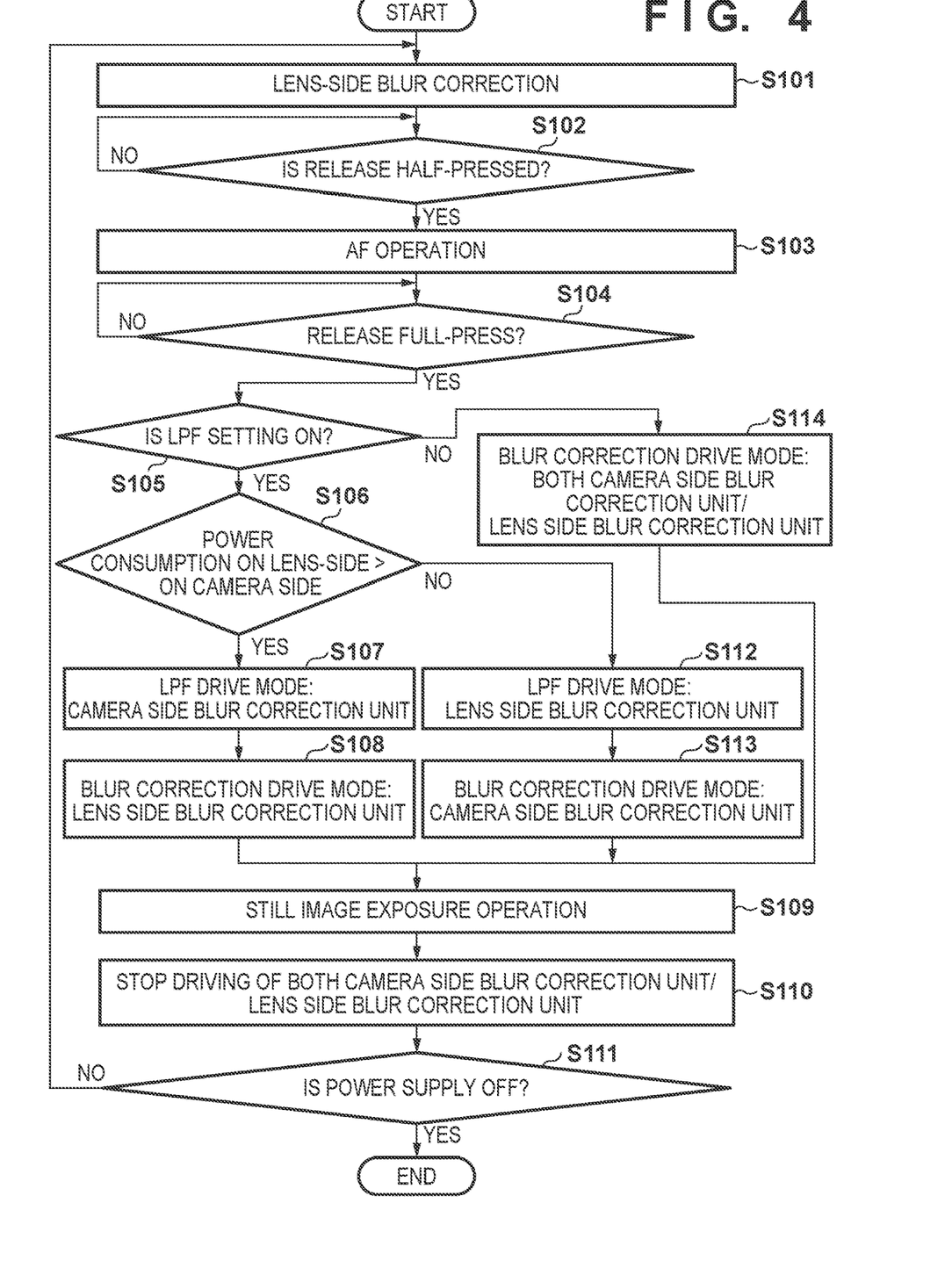
FIG. 4 is a flowchart which illustrates an image capture operation of the digital camera system.

Next, an image capture operation of the digital camera system 100 of the present embodiment will be described using FIG. 4. FIG. 4 is a flowchart for describing an LPF operation and a blur correction operation at a time of still image capturing.

The camera body 1 in the present embodiment can change an LPF setting using a menu, and in a case where an LPF mode is ON, it is possible to achieve an LPF effect by LPF driving of the above-described blur correction unit. Meanwhile, in a case where the LPF mode is OFF, LPF driving is not performed by the blur correction unit, and there is no LPF effect in the image capturing. The user can switch the LPF setting ON/OFF on a menu screen displayed on the display unit 16.

The flowchart of FIG. 4 is started when the power supply of the camera body 1 is set to ON.

In step S101, the camera system control unit 10 communicates with the lens system control unit 30, and causes the lens side blur correction unit 34 to start blur correction driving of the shift lens 40. The lens side blur correction unit 34 drives the shift lens 40 based on the signal of the gyro sensor 18 and performs an operation of correcting the image blur due to hand shaking.

In step S102, the camera system control unit 10 determines whether or not a half-press operation was performed by the user on the release button arranged in the operation unit 15. In a case where a half-press operation of the release button was performed, the processing advances to step S103, and if not, step S102 is repeated until a half-press operation of the release button is performed.

In step S103, the camera system control unit 10 performs an AF operation and drives the focus lens.

In step S104, the camera system control unit 10 determines whether or not a release button is fully pressed to thereby make a still image exposure instruction. In a case where a full-press operation of the release button was performed, the processing advances to step S105, and if not, step S104 is repeated until a full-press of the release button is performed. The interval of step S101 to step S104 corresponds to the interval prior to exposure of still image capturing.

In step S105, the camera system control unit 10 determines whether or not the LPF setting is on. In a case where the LPF setting is ON, the processing advances to step S106, and in a case where the LPF setting is OFF the processing advances to step S114.

In step S106, the camera system control unit 10 determines which of the camera side blur correction unit 17 and the lens side blur correction unit 34 has the larger power consumption in the LPF driving mode. The power consumption in the LPF driving mode of each blur correction unit is stored in advance in a storage unit of the camera system control unit 10 or the lens system control unit 30. In a case where it is determined that the power consumption is larger for LPF driving in the lens side blur correction unit 34 than for LPF driving in the camera side blur correction unit 17, the processing advances to step S107, and when it is determined that this is not the case, the processing advances to step S112.

In step S107, the camera system control unit 10 (the LPF drive selection unit 10b) sets the camera side blur correction unit 17 to an LPF driving mode, and performs circular operation driving by a high frequency in relation to the image capturing element 11.

In step S108, the camera system control unit 10 communicates with the lens system control unit 30, and sets the lens side blur correction unit 34 to a blur correction drive mode, and performs driving for blur correction. Note that the blur correction driving and characteristics in step S101 may be different to the blur correction driving in step S108.

In step S109, the camera system control unit 10 drives the shutter 14, causes the image capturing element 11 to be exposed, and performs still image capturing.

When the still image capture operation of step S109 ends, in step S110, the camera system control unit 10 causes driving of both of the camera side blur correction unit 17 and the lens side blur correction unit 34 to stop.

In step S111, the camera system control unit 10 determines whether or not the power supply switch included in the operation unit 15 was operated to turn OFF the power supply. In the case where the power supply is determined to be turned OFF, the operation of the flowchart is ended, and if not, step S101 is returned to.

Meanwhile, in step S112, the camera system control unit 10 (the LPF drive selection unit 10b) sets the lens side blur correction unit 34 to the LPF driving mode, and performs circular operation driving by a high frequency in relation to the shift lens 40.

In step S113, the camera system control unit 10 sets the camera side blur correction unit 17 to a blur correction drive mode, and performs driving for blur correction. Then, the processing advances to step S109.

In step S114, the camera system control unit 10 determines that the LPF setting is set to OFF in step S105, and performs blur correction driving without performing the LPF operation of the camera side blur correction unit 17 and the lens side blur correction unit 34. Then, the processing advances to step S109.

As described above, in the present embodiment, by performing LPF driving using a blur correction unit at the time of still image capturing, it is possible to obtain an LPF effect without having an optical LPF. Then, the camera system control unit 10 (the LPF drive selection unit 10b) determines which blur correction unit to perform the LPF driving with in accordance with power consumption at the time of LPF driving of the camera side blur correction unit 17 and the lens side blur correction unit 34. By this, it becomes possible to appropriately achieve an LPF effect considering power consumption.

In the present embodiment, one blur correction unit performs an operation to achieve an LPF effect in the LPF driving mode, and the other blur correction unit performs an operation for blur correction. However, in the blur correction unit driven in the LPF driving mode, an operation for blur correction may be overlapped.

For example, blur correction may be performed in the two blur correction units, distributing the amount of driving for blur correction at a particular ratio. In such a case, setting the amount of driving for blur correction in the blur correction unit that operate in the LPF driving mode to a small ratio in relation to the amount of driving of the blur correction unit that performs driving for blur correction can be considered.

The amount of driving for blur correction of the blur correction unit set in the LPF driving mode is set to an amount with a small impact on the accuracy and power standpoint in relation to LPF driving. Also, configuration may be taken so that when image blur cannot be fully corrected when the blur correction is performed by a blur correction unit that does not perform LPF driving, the blur correction unit that performs the LPF driving overlappedly performs an operation for blur correction. For example, a step for determining whether or not a shake amount detected prior to the exposure operation is greater than or equal to a threshold may be arranged. Then, in a case where the shake amount is less than the threshold, blur correction may be performed by the blur correction unit that does not perform LPF driving during exposure, and in the case where the shake amount is greater than or equal to the threshold, the blur correction may be performed by both the blur correction unit that performs the LPF driving and the blur correction unit that does not perform the LPF driving.

<Other Configurations>

In the present embodiment, the camera system control circuit 10 was described as performing an operation of an LPF driving mode by whichever of the camera side blur correction unit 17 and the lens side blur correction unit 34 has the lower power consumption in the LPF driving mode, but other criteria may also be selected.

For example, since the camera body 1 supplies power to the interchangeable lens 3 via the lens contact point 20, usually the driver unit in the interchangeable lens 3 has a lower limited current value during driving than the camera body 1. For that reason, even when the power consumption of the lens side blur correction unit 34 is smaller than the power consumption of the LPF driving mode, there are cases where it is better to drive the camera side blur correction unit 17 in the LPF driving mode from the standpoint of the limited current value. Accordingly, the camera system control unit 10 may select whichever of the camera side blur correction unit 17 and the lens side blur correction unit 34 has the higher drive current limit value as the blur correction unit that operates in the LPF driving mode.

<Drive Position Accuracy Determination>

Also, whichever of the camera side blur correction unit 17 and the lens side blur correction unit 34 has the higher accuracy when driving, particularly the accuracy in the minute-driving range (during a minute driving operation), may be selected as the blur correction unit to operate in the LPF driving mode. For example, for the movable portion of the blur correction unit, a position on the XY plane is detected using a position detection sensor such as a Hall element, for example, and position control is performed. Depending on the position detection sensor type, a difference in accuracy will be introduced in a minute-driving range as in LPF driving. Accordingly, it is possible to achieve a highly accurate LPF effect by operating in the LPF driving mode whichever of the camera side blur correction unit 17 and the lens side blur correction unit 34 has the higher accuracy in the minute-driving range.

<Determination of the Focal Length>

Also, configuration may be taken to select which of the camera side blur correction unit 17 and the lens side blur correction unit 34 to operate in the LPF driving mode depending on the focal length of the interchangeable lens 3. For example, in a case where the movement amount of the image capturing element 11 by the camera side blur correction unit 17 is the same, the shorter the focal length the larger the blur correction angle. Accordingly, in the case where the focal length is less than a predetermined value, blur correction is performed by the camera side blur correction unit 17, and the lens side blur correction unit 34 is caused to operate in the LPF driving mode. Meanwhile, in the case where the focal length is greater than or equal to a predetermined value, blur correction is performed by the lens side blur correction unit 34, and the camera side blur correction unit 17 is caused to operate in the LPF driving mode. By such control, it is possible to achieve an LPF effect appropriately without significantly reducing the angle at which correction is possible in the blur correction.

<Determination by Magnetic Field Noise Intensity>

Also, the selection for operation in the LPF driving mode between the camera side blur correction unit 17 and the lens side blur correction unit 34 may be made in accordance with the intensity of magnetic field noise that occurs during driving. There are various blur correction unit driving methods, and depending on the type of drive actuator, layout, and drive mode, the intensity of the magnetic field noise that is generated by the blur correction unit including the actuator differs. Note that "magnetic field noise" means a magnetic field that is produced from a magnetic circuit of the blur correction unit, and noise is produced in images obtained by the image capturing element due to this magnetic field reaching the image capturing element.

The intensity of magnetic field noise means the intensity of the magnetic field that reaches the image capturing plane of the image capturing element 11 in the present embodiment. Note that the magnetic field noise that reaches the image capturing element 11 is inversely proportional to the distance between the image capturing element and the magnetic circuit which is a magnetic field generation source, and the magnetic field noise that reaches the image capturing element becomes stronger when the distance is short even in the case where the same intensity magnetic field is produced. Accordingly, in the case where the camera side blur correction unit 17 and the lens side blur correction unit 34 produce magnetic field noise of the same intensity during LPF driving, the magnetic field noise due to the camera side blur correction unit 17 which is closer to the image capturing element 11 is stronger. Accordingly, in the case where the intensities of the magnetic fields produced in the LPF driving mode of the camera side blur correction unit 17 and the lens side blur correction unit 34 are the same, the lens side blur correction unit 34 which is positioned farther from the image capturing element 11 may be selected as the blur correction unit that operates in the LPF driving mode.

Note that in the case where the ISO sensitivity set by the camera body 1 is high, since the noise that occurs in the image increases, it is to perform LPF driving using the blur correction unit whose magnetic field noise intensity is lower.

<Combinations>

Also, configuration may be taken to select which of the camera side blur correction unit 17 and the lens side blur correction unit 34 to operate in the LPF driving mode depending on a combination of the above conditions. For example, the priority of the conditions is set in order of power consumption during LPF driving, accuracy of minute-driving range of the blur correction driver unit, focal length of the image capturing optical system 32, and magnetic field noise intensity. First, the power consumption during LPF driving in the camera side blur correction unit 17 and the lens side blur correction unit 34 is compared, and if the difference in the power consumption is greater than or equal to a threshold, LPF driving is performed by the blur correction unit whose power consumption is lower. If the difference in power consumption is less than a threshold, the accuracy of the minute-driving range of the blur correction unit is next compared. If the difference in the accuracy of the minute-driving range of the two blur correction units is greater than or equal to a predetermined value, the LPF driving is performed by the blur correction unit whose minute-driving range accuracy is higher, and in the case where the difference in minute-driving range accuracy is less than a predetermined value, next the focal length of the image capturing optical system is compared. If the focal length is, for example, less than 50 mm or greater than or equal to 100 mm or the like, the blur correction unit is selected in accordance with the focal length. Next, the intensity of the magnetic field noise is compared, and it is determined which blur correction unit the LPF driving is to be performed by.

<When Stopped>

Note that if the blur correction function setting of the camera body 1 is in an OFF state when there is no hand shaking or little hand shaking such as when the camera body 1 is installed on a tripod, the blur correction unit whose power consumption when blur correction operation is stopped is larger may be set to the LPF driving mode.

For example, a case where the actuator of the camera side blur correction unit 17 is of a so-called voice coil motor method (hereinafter, a VCM method) made up of a magnet and a coil will be described. In the case of the VCM method, supply power is supplied to the coil to keep the image capturing element 11 in the center which is an initial position even in the case where a blur correction operation is not performed, and power is consumed thereby. It is similar in the case where the lens side blur correction unit is VCM.

Meanwhile, in the case where the method of driving the camera side blur correction unit 17 is a method (hereinafter, the STM method) where a movable portion is caused to move translationally by using the stepping motor and the lead screw, in the case where the blur correction operation is not performed, it is not necessary to supply power to the actuator even to maintain the initial position. Also, even if power is supplied, the power consumption is low. It is similar in the case where the lens side blur correction unit is the STM method.

For example, with the lens side blur correction unit 34 in the VCM method and the camera side blur correction unit 17 in the STM method, in the case where the blur correction function is OFF, it is possible to reduce power consumption of the camera overall more by setting the lens side blur correction unit 34 in the LPF driving mode. Also, configuration may be taken such that, if the power consumption for maintaining the blur correction mechanism at an initial position is less than or equal to a predetermined value in a state in which the blur correction unit does not perform a blur correction operation, drive the other in the LPF driving mode. Note that in addition to types of blur correction unit driving methods, a similar concept can be applied to cases where blur correction is not performed and cases of a mechanism for mechanically locking and maintaining an image capturing element or shift lens, where the mechanism does not consume power during the locking.

Second Embodiment

As described in the above first embodiment, to achieve an LPF effect in still image capturing, it is sufficient to perform a circular operation of at least one period's worth during a still image exposure, but it is more advantageous to have performed a circular operation a plurality of times at a high frequency considering circular operation speed non-uniformity and the like. However, in the case where circular operation drive frequency is fixed, the number of times that the circular operation is performed increases as the time for the still image exposure becomes longer. If it is possible to perform a certain number of circular operations during a single still image exposure time period, the impact on the obtained image will be very small.

Accordingly, in the second embodiment, the drive frequency of the circular operation in the LPF driving mode is changed in accordance with the still image exposure time period. When the circular operation drive frequency is made lower, it is possible to reduce the power consumption by the blur correction unit. For example, while the time of exposure Ts set in advance prior to still image capturing is less than a predetermined period of time Th, the drive frequency Fs of the circular operation is set to Fd [Hz]. Meanwhile, in the case where the exposure period is greater than or equal to the predetermined period of time Th, a circular operation drive frequency is calculated by the calculation equation shown in Expression (2).

$$Fs = N \cdot (1/Ts) \quad (2)$$

Here, N is a number of circular operations that is considered to be sufficient for speed non-uniformity or the like, and is set so that the impact on the obtained image will be small if N periods' worth of the circular operation is performed during the still image exposure. As shown in Expression (2), when the still image exposure time period become longer, the drive frequency of the circular operation becomes lower. By this, it is possible to reduce the power consumption even while achieving a sufficient LPF effect in accordance with the still image exposure time.

Note that by the still image exposure time period becoming longer than the predetermined value, consumption of power is lowered when the drive frequency of the circular operation in the LPF driving mode drops, and therefore it becomes less likely that the limit value of the drive current of the camera body 1 will be exceeded even if the blur correction operation is performed simultaneously to the LPF driving operation. Also, typically, when the exposure period is long, the shake amount becomes large. Accordingly, if the still image exposure time period is longer than a predetermined value, the blur correction operation may be performed in parallel while performing LPF driving by the blur correction unit that performs the LPF driving mode. The result of this is that it is possible to make the blur correction amount large while achieving the LPF effect. Meanwhile, in the case where the still image exposure time period is less than or equal to a predetermined value, the blur correction operation is not performed.

The disclosure is not limited to the above embodiments and various changes and modifications can be made within the spirit and scope of the disclosure. Therefore, to apprise the public of the scope of the disclosure, the following claims are made.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-111909, filed Jun. 29, 2020, which is hereby incorporated by reference herein in its entirety.

What is claimed is:

1. An apparatus, comprising
at least one processor; and
a memory coupled to the at least one processor storing instructions
that, when executed by the at least one processor, cause the processor to function as:
an obtaining unit configured to obtain information related to a shake detected by a sensor, and
a control unit configured to cause one correction device, out of a first correction device that is positioned in a lens and that can correct a blur based on the information related to the shake and a second correction device that is positioned in a capturing apparatus and that can correct image blur based on the information related to the shake, to perform a blur correction operation, and configured to cause the other correction device, out of the first correction device and the second correction device, to perform a periodic operation.

2. The apparatus according to claim 1, wherein the control unit, during an exposure period of the capturing apparatus, causes the other correction device to perform the periodic operation a plurality of times.

3. The apparatus according to claim 1, wherein the control unit further causes the other correction device to perform the blur correction operation in addition to the periodic operation.

4. The apparatus according to claim 3, wherein the control unit makes a proportion of blur correction that the other correction device is caused to perform smaller than a proportion of a blur correction that the one correction device is caused to perform.

5. The apparatus according to claim 1, wherein the periodic operation is an operation in which an image formed by the lens is caused to move in a circle on a capturing plane of the capturing apparatus.

6. The apparatus according to claim 1, wherein the control unit causes the correction device whose power consumption in a case of being caused to perform the periodic operation is lower, out of the first correction device and the second correction device, to perform the periodic operation.

7. The apparatus according to claim 1, wherein the control unit causes the correction device whose drive current limit value is higher, out of the first correction device and the second correction device, to perform the periodic operation.

8. The apparatus according to claim 1, wherein the control unit causes the first correction device to perform the periodic operation in a case where a focal length of the lens is less than a predetermined value, and causes the second correction device to perform the periodic operation in a case where the focal length is greater than or equal to the predetermined value.

9. The apparatus according to claim 1, wherein the control unit causes the correction device whose position accuracy during minute-driving is higher, out of the first correction device and the second correction device, to perform the periodic operation.

10. The apparatus according to claim 1, wherein the control unit causes the correction device whose magnetic field noise generation in a case of being caused to perform the periodic operation is lower, out of the first correction device and the second correction device, to perform the periodic operation.

11. The apparatus according to claim 10, wherein the control unit, if an ISO sensitivity set in the capturing apparatus is greater than or equal to a predetermined value, causes the correction device whose magnetic field noise generation in a case of being caused to perform the periodic operation is lower, out of the first correction device and the second correction device, to perform the periodic operation.

12. The apparatus according to claim 1, wherein the control unit, in a case of not performing the blur correction operation, causes the correction device whose power consumption in the case of not performing the blur correction operation is larger, out of the first correction device and the second correction device, to perform the periodic operation.

13. The apparatus according to claim 1, wherein the control unit changes a drive frequency of the periodic operation in accordance with an exposure period of the capturing apparatus.

14. The apparatus according to claim 1, wherein the control unit,
in a case where an exposure period of the apparatus is larger than a predetermined value,
further causes the other correction device to perform the blur correction operation in addition to the periodic operation, and
in a case where an exposure period is less than or equal to the predetermined value,
causes the other correction device to perform the blur correction operation in addition to the periodic operation.

15. A method comprising:
obtaining information related to a shake detected by a sensor, and
causing one correction device, out of a first correction device that is positioned in a lens and that can correct a blur based on the information related to the shake and a second blur correction device that is positioned in a capturing apparatus and that can correct image blur based on the information related to the shake, to perform a blur correction operation, and causing the other correction device, out of the first correction device and the second correction device, to perform a periodic operation.

16. The method according to claim 15, wherein the periodic operation is an operation in which an image formed by the lens is caused to move in a circle on a capturing plane of the capturing apparatus.

17. The method according to claim 15, further comprising changing a drive frequency of the periodic operation in accordance with an exposure period of the capturing apparatus.

18. A non-transitory computer-readable storage medium storing a program for causing a computer to function as each of units of an apparatus, the apparatus comprising:
an obtaining unit configured to obtain information related to a shake detected by a sensor, and
a control unit configured to cause one correction device, out of a first correction device that is positioned in a lens and that can correct a blur based on the information related to the shake and a second correction device that is positioned in a capturing apparatus and that can correct image blur based on the information related to the shake, to perform a blur correction operation, and configured to cause the other correction device, out of the first correction device and the second correction device, to perform a periodic operation.

* * * * *